US012706312B2

(12) United States Patent
Moon et al.

(10) Patent No.: US 12,706,312 B2
(45) Date of Patent: Aug. 11, 2026

(54) NEGATIVE ELECTRODE AND SECONDARY BATTERY INCLUDING THE NEGATIVE ELECTRODE

(71) Applicant: LG Energy Solution, Ltd., Seoul (KR)

(72) Inventors: Il Jae Moon, Daejeon (KR); Woo Ha Kim, Daejeon (KR); Sung Soo Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 290 days.

(21) Appl. No.: 18/025,326

(22) PCT Filed: Apr. 28, 2022

(86) PCT No.: PCT/KR2022/006059
§ 371 (c)(1),
(2) Date: Mar. 8, 2023

(87) PCT Pub. No.: WO2022/231325
PCT Pub. Date: Nov. 3, 2022

(65) Prior Publication Data

US 2024/0290984 A1 Aug. 29, 2024

(30) Foreign Application Priority Data

Apr. 30, 2021 (KR) ........................ 10-2021-0056905

(51) Int. Cl.
*H01M 4/62* (2006.01)
*H01M 4/04* (2006.01)
(Continued)

(52) U.S. Cl.
CPC ......... *H01M 4/625* (2013.01); *H01M 4/0416* (2013.01); *H01M 4/366* (2013.01); *H01M 4/583* (2013.01); *H01M 2004/027* (2013.01)

(58) Field of Classification Search
None
See application file for complete search history.

(56) References Cited

U.S. PATENT DOCUMENTS

2008/0292968 A1 11/2008 Lee et al.
2013/0302661 A1 11/2013 Kim et al.
(Continued)

FOREIGN PATENT DOCUMENTS

CN 102683644 A 9/2012
CN 111954949 A 11/2020
(Continued)

OTHER PUBLICATIONS

Al-Hamadani, Y. A.J. et al., "Stabilization and dispersion of carbon nanomaterials in aqueous solutions: A review" Separation and Purification Technology, Nov. 2, 2015, vol. 156, pp. 861-874, Elsevier.
(Continued)

*Primary Examiner* — Tracy M Dove
(74) *Attorney, Agent, or Firm* — Lerner David LLP

(57) ABSTRACT

Provided is a negative electrode including a negative electrode active material layer, wherein the negative electrode active material layer includes a negative electrode active material, a binder, a conductive agent, and a dispersant, wherein the conductive agent includes a carbon nanotube structure in which a plurality of single-walled carbon nanotube units are bonded side by side, the carbon nanotube structure has an average length of 1 μm to 20 μm, and QBR according to Equation 1 is in a range of 1 to 1.75

$$QBR = Bs/Bf. \quad \text{[Equation 1]}$$

14 Claims, 1 Drawing Sheet

(51) Int. Cl.

| | |
|---|---|
| ***H01M 4/36*** | (2006.01) |
| ***H01M 4/583*** | (2010.01) |
| *H01M 4/02* | (2006.01) |

(56) References Cited

U.S. PATENT DOCUMENTS

| | | | |
|---|---|---|---|
| 2019/0123352 | A1 | 4/2019 | Ko et al. |
| 2021/0020907 | A1 | 1/2021 | Kim et al. |
| 2021/0328225 | A1 | 10/2021 | Kim et al. |
| 2022/0029150 | A1 | 1/2022 | Shin et al. |
| 2022/0166027 | A1 | 5/2022 | Kim et al. |
| 2022/0238886 | A1 | 7/2022 | Kim et al. |
| 2022/0255060 | A1 | 8/2022 | Oh et al. |
| 2022/0285689 | A1 | 9/2022 | Yun et al. |
| 2023/0187644 | A1 | 6/2023 | Morita et al. |
| 2024/0079554 | A1 | 3/2024 | Kim et al. |

FOREIGN PATENT DOCUMENTS

| | | | |
|---|---|---|---|
| CN | 112331831 | A | 2/2021 |
| JP | 2007200686 | A | 8/2007 |
| JP | 2009518809 | A | 5/2009 |
| JP | 2013235824 | A | 11/2013 |
| JP | 2015167127 | A | 9/2015 |
| JP | 2020029471 | A | 2/2020 |
| JP | 6860740 | B1 | 4/2021 |
| KR | 20190043957 | A | 4/2019 |
| KR | 20190093174 | A | 8/2019 |
| KR | 2020-0027787 | A | 3/2020 |
| KR | 20200071543 | A | 6/2020 |
| KR | 20210015714 | A | 2/2021 |
| KR | 20210016799 | A | 2/2021 |
| KR | 20210023760 | A | 3/2021 |
| KR | 20210040796 | A | 4/2021 |
| WO | 2021034145 | A1 | 2/2021 |

OTHER PUBLICATIONS

International Search Report for Application No. PCT/KR2022/006059 mailed Aug. 12, 2022, pp. 1-3.

Extended European Search Report including Written Opinion for Application No. 22796157.0, dated Oct. 28, 2024, 10 pgs.

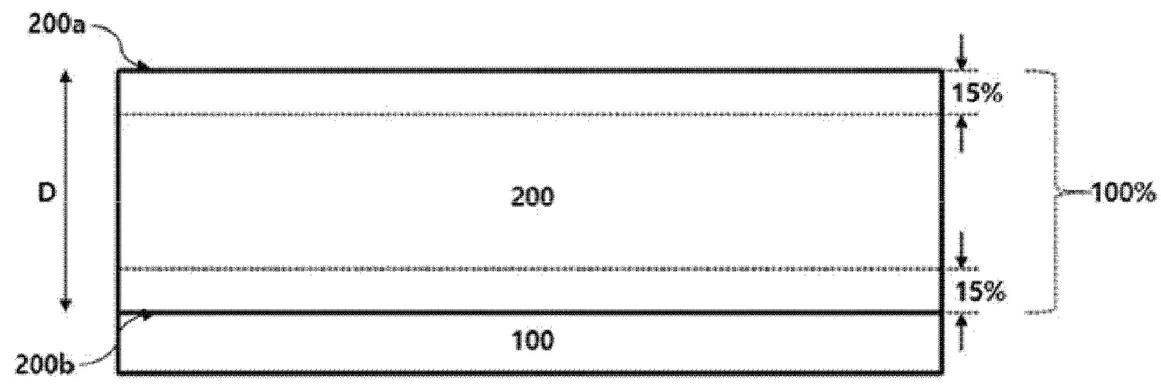
200a
D
200
100
200b
15%
15%
100%

NEGATIVE ELECTRODE AND SECONDARY BATTERY INCLUDING THE NEGATIVE ELECTRODE

CROSS-REFERENCE TO RELATED APPLICATIONS

This application is a national phase entry under 35 U.S.C. § 371 of International Application No. PCT/KR2022/006059, filed on Apr. 28, 2022, which claims priority from Korean Patent Application No. 10-2021-0056905, filed on Apr. 30, 2021, the disclosures of are incorporated by reference herein.

TECHNICAL FIELD

The present disclosure relates to a negative electrode and a secondary battery including the negative electrode, wherein the negative electrode means a negative electrode in which a binder migration problem may be minimized.

BACKGROUND ART

Demand for batteries as an energy source has been significantly increased as technology development and demand with respect to mobile devices have recently increased, and a variety of research on batteries capable of meeting various needs has been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode. The negative electrode active material is included in a negative electrode active material layer in the negative electrode. Graphite is mainly used as the negative electrode active material. Specifically, most of the negative electrode active material may correspond to graphite, and, more specifically, only graphite may be used as the negative electrode active material.

Since a binder present in the negative electrode active material layer moves to an upper portion of the negative electrode active material layer during a negative electrode preparation process, a relatively small amount of the binder is present in a lower portion of the negative electrode active material layer in contact with a current collector. Accordingly, there is a problem in that adhesion (hereinafter, negative electrode adhesion) between the negative electrode active material layer and the current collector is decreased.

In order to solve this problem, a technique, such as forming the negative electrode active material layer in a plurality of layers, has been introduced, but, since an additional process is required to form the plurality of layers, the process may be cumbersome. Also, conventionally, a technique of using a binder with strong adhesion or controlling drying conditions of the negative electrode has been used, but there are disadvantages in that preparation costs are increased and productivity is reduced.

Thus, there is a need for a new technique capable of solving the above-described binder migration problem.

Technical Problem

An aspect of the present disclosure provides a negative electrode with improved negative electrode adhesion.

Another aspect of the present disclosure provides a secondary battery including the negative electrode.

Technical Solution

According to an aspect of the present disclosure, there is provided a negative electrode including a negative electrode active material layer, wherein the negative electrode active material layer includes a negative electrode active material, a binder, a conductive agent, and a dispersant, wherein the conductive agent includes a carbon nanotube structure in which a plurality of single-walled carbon nanotube units are bonded side by side, the carbon nanotube structure has an average length of 1 μm to 20 μm, and QBR according to the following Equation 1 is in a range of 1 to 1.75.

$$QBR = Bs/Bf \qquad \text{[Equation 1]}$$

wherein Bs is an average value of the number of binders which is measured in a range from an upper surface of the negative electrode active material layer to a distance corresponding to 15% of a total thickness of the negative electrode active material layer in a direction toward a lower surface of the negative electrode active material layer, and Bf is an average value of the number of binders which is measured in a range from the lower surface of the negative electrode active material layer to a distance corresponding to 15% of the total thickness of the negative electrode active material layer in a direction toward the upper surface of the negative electrode active material layer.

According to another aspect of the present disclosure, there is provided a secondary battery including the negative electrode.

Advantageous Effects

With respect to a negative electrode according to the present disclosure, carbon nanotube structures in the form of a rope (long fiber form) are connected to each other to form a network structure in the negative electrode, and two kinds of dispersants are used in the formation and dispersion of the carbon nanotube structures. The carbon nanotube structure is present in a conductive agent dispersion, and an electrode slurry is formed through the conductive agent dispersion, wherein the two kinds of dispersants form carbon nanotube structures having an appropriate diameter in the conductive agent dispersion and may also play a role in suppressing re-aggregation of the carbon nanotube structures during the preparation of the electrode slurry. Accordingly, the carbon nanotube structures are evenly dispersed in the negative electrode slurry to form an effective network and simultaneously increase zero-shear viscosity of the negative electrode slurry. Thus, binder migration may be suppressed by the network caused by the carbon nanotube structures. Also, even if the negative electrode slurry is coated on a current collector, the binder migration in the negative electrode slurry may be further suppressed by the zero-shear viscosity. As a result, a sufficient amount of a binder may be present in a lower portion of a negative electrode active material layer. Therefore, since negative electrode adhesion may be improved, life performance of a battery may be improved. Furthermore, since the negative electrode adhesion is not reduced even if coating speed of the negative electrode active material layer is increased, productivity of the negative electrode may be improved.

BRIEF DESCRIPTION OF THE DRAWINGS

FIGURE is a schematic diagram for explaining a measurement method of Equation 1 of the present specification.

DETAILED DESCRIPTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the disclosure, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

The expression "QBR" in the present specification may be confirmed through a scanning electron microscope (SEM) (Jeol 7900f) by Zeol.

Hereinafter, the present disclosure will be described in detail.

Negative Electrode

A negative electrode according to the present disclosure may be a negative electrode including a negative electrode active material layer, wherein the negative electrode active material layer includes a negative electrode active material, a binder, a conductive agent, and a dispersant, wherein the conductive agent includes a carbon nanotube structure in which a plurality of single-walled carbon nanotube units are bonded side by side, the carbon nanotube structure has an average length of 1 μm to 20 μm, and QBR according to the following Equation 1 is in a range of 1 to 1.75.

$$QBR = Bs/Bf \quad \text{[Equation 1]}$$

wherein Bs is an average value of the number of binders which is measured in a range from an upper surface of the material layer to a distance negative electrode active material corresponding to 15% of a total thickness of the negative electrode active material layer in a direction toward a lower surface of the negative electrode active material layer, and Bf is an average value of the number of binders which is measured in a range from the lower surface of the negative electrode active material layer to a distance corresponding to 15% of the total thickness of the negative electrode active material layer in a direction toward the upper surface of the negative electrode active material layer.

The negative electrode may include a negative electrode active material layer, and may more specifically include a current collector and a negative electrode active material layer disposed on the current collector. However, the negative electrode does not exclude a so-called "free-standing negative electrode" in which the negative electrode is composed only of a negative electrode active material layer without a current collector.

The current collector is not particularly limited so long as it has conductivity without causing adverse chemical changes in the battery. For example, copper, stainless steel, aluminum, nickel, fired titanium, carbon, aluminum or stainless steel that is surface-treated with one of carbon, nickel, titanium, silver, or the like may be used as the current collector. Specifically, a transition metal that absorbs carbon well, such as copper and nickel, may be used as the current collector.

The negative electrode active material layer may be disposed on one surface or both surfaces of the current collector. Of course, with respect to the free-standing negative electrode, the negative electrode active material layer may become a negative electrode by itself without the current collector.

The negative electrode active material layer may include a negative electrode active material, a binder, a conductive agent, and a dispersant.

The negative electrode active material layer may include graphite, and more specifically, the negative electrode active material may be the graphite. That is, only the graphite may be used as the negative electrode active material. In this case, initial efficiency and life characteristics of the battery may be improved. The graphite may include at least one of artificial graphite and natural graphite.

The graphite may be included in an amount of 80 wt % to 99 wt % in the negative electrode active material layer, and may specifically be included in an amount of 90 wt % to 98 wt %. In a case in which the graphite constitutes most of the negative electrode active material layer, a negative electrode adhesion reduction phenomenon due to binder migration is generally more severe. The present disclosure shows that the binder migration may be suppressed even in the case that the graphite constitutes most of the negative electrode active material layer.

The binder is for securing adhesion between the negative electrode active materials or adhesion of the negative electrode active material to the current collector, wherein common binders used in the art may be used, and types thereof are not particularly limited. The binder, for example, may include a polyvinylidene fluoride-hexafluoropropylene copolymer (PVDF-co-HEP), polyvinyl alcohol, polyacrylonitrile, starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, carboxymethyl cellulose (CMC), a styrene-butadiene rubber (SBR), a fluoro rubber, or various copolymers thereof, and any one thereof or a mixture of two or more thereof may be used.

The binder may be included in an amount of 0.1 wt % to 10 wt % based on a total weight of the electrode active material layer, and may be specifically included in amount of 0.5 wt % to 5 wt %. In a case in which the amount of the binder satisfies the above range, excellent negative electrode adhesion may be achieved while minimizing an increase in negative electrode resistance.

The conductive agent may include a carbon nanotube structure.

The carbon nanotube structure may include a plurality of single-walled carbon nanotube units. Specifically, the carbon nanotube structure may be one in which a plurality of single-walled carbon nanotube units are bonded side by side. The single-walled carbon nanotube units may be arranged side by side and bonded in the carbon nanotube structure (cylindrical structure having flexibility in which the units are bonded such that long axes of the units are parallel to each other) to form the carbon nanotube structure. The carbon nanotube structures are interconnected in the electrode to form a network structure.

The carbon nanotube structure may be a carbon nanotube structure in which 2 to 5,000 single-walled carbon nanotube units are bonded side by side, and, more specifically, the carbon nanotube structure may be a carbon nanotube structure in which 2 to 4,500 single-walled carbon nanotube units are bonded to each other. For example, in consideration of dispersibility of the carbon nanotube structure and durability of the electrode, the carbon nanotube structure is most preferably a carbon nanotube structure in which 2 to 50 single-walled carbon nanotube units are bonded to each other.

Conventional electrodes including carbon nanotubes are generally prepared by dispersing bundle type or entangled type carbon nanotubes (form in which single-walled carbon nanotube units or multi-walled carbon nanotube units are attached to each other or intertwined) in a dispersion medium to prepare a conductive agent dispersion and then using the conductive agent dispersion. In this case, the carbon nanotubes are completely dispersed in the conventional conductive agent dispersion to exist as a conductive agent dispersion in which carbon nanotube units in the form of a single strand are dispersed. In the conventional conductive agent dispersion, the carbon nanotube units are easily cut by an excessive dispersion process so that the carbon nanotube units have a length shorter than an initial length. Also, the carbon nanotube units may also be easily cut in a rolling process of the negative electrode, and an additional limitation occurs in which the carbon nanotube units (particularly, single-walled carbon nanotube units) are cut by an excessive volume change of the negative electrode active material during operation of the battery. Accordingly, conductivity of the negative electrode may be reduced to degrade the life characteristics of the battery. Furthermore, with respect to the multi-walled carbon nanotube unit, structural defects are high due to a mechanism of node growth (not a smooth linear shape, but nodes are present due to defects generated during a growth process). Thus, during the dispersion process, the multi-walled carbon nanotube units are more easily cut, and the short-cut multi-walled carbon nanotube units are likely to be aggregated with each other via I-n stacking of carbons of the unit. Accordingly, it is difficult for the multi-walled carbon nanotube units to be more uniformly dispersed and present in a negative electrode slurry.

Alternatively, with respect to the carbon nanotube structure included in the negative electrode of the present disclosure, since the carbon nanotube structure is in the form of a rope in which a plurality of single-walled carbon nanotube units maintaining relatively high crystallinity without structural defects are bonded side by side, the single-walled carbon nanotube units may not be cut even with excessive changes in the volume of the negative electrode active material and their length may be smoothly maintained, and thus, the conductivity of the negative electrode may be maintained. Also, since the conductivity of the electrode is increased due to high conductivity of the single-walled carbon nanotube unit having high crystallinity, input characteristics, output characteristics, and life characteristics of the battery may be significantly improved. Furthermore, since the carbon nanotube structures may be interconnected to have a network structure in the electrode, crack generation may be prevented by suppressing the excessive changes in the volume of the negative electrode active material and a strong conductive network may be secured at the same time.

Also, since the carbon nanotube structure is not easily broken and may maintain its long shape, the conductive network may be strengthened over the entire negative electrode active material layer. Furthermore, the negative electrode adhesion may be significantly improved by inhibiting exfoliation of the negative electrode active material.

The carbon nanotube structure may play a role in suppressing the binder migration. Specifically, since the carbon nanotube structure is in the form of a long rope and may form a single network with the binder, it increases zero-shear viscosity of the negative electrode slurry. Accordingly, since movement of the binder in the negative electrode slurry may be suppressed, the binder migration may be suppressed during drying of the negative electrode slurry and the negative electrode adhesion may be improved.

The carbon nanotube structure may have an average length of 1 μm to 20 μm, particularly 1 μm to 10 μm, and more particularly 2 μm to 7 μm, for example, 3 μm to 7 μm. In a case in which the average length of the carbon nanotube structure is less than 1 μm, since the conductive network structure may not be effectively formed in the negative electrode, the binder migration may not be suppressed, and thus, the negative electrode adhesion is reduced and the negative electrode resistance is increased. In contrast, in a case in which the average length of the carbon nanotube structure is greater than 20 μm, since the number of carbon nanotube structures is decreased when the same amount of the carbon nanotube structure is used, it is difficult to form a wide and uniform network in the negative electrode.

Accordingly, the negative electrode adhesion is reduced, and there is a problem in that uniformity of the negative electrode adhesion and resistance is reduced. The average length corresponds to an average value of lengths of top 100 carbon nanotube structures having a large average length and bottom 100 carbon nanotube structures when the prepared electrode is observed by a scanning electron microscope (SEM).

The carbon nanotube structure may have an average diameter of 5 nm to 100 nm, particularly 5 nm to 30 nm, and more particularly 5 nm to 20 nm. When the average diameter of the carbon nanotube structure satisfies the above range, the conductive network is effectively formed to improve the negative electrode adhesion, and there is an effect of reducing the negative electrode resistance and battery resistance. The average diameter corresponds to an average value of diameters of top 100 carbon nanotube structures having a large average diameter and bottom 100 carbon nanotube structures when the prepared negative electrode is observed by an SEM.

The carbon nanotube structure may be included in an amount of 0.005 wt % to 0.2 wt %, particularly 0.01 wt % to 0.1 wt %, and more particularly 0.015 wt % to 0.075 wt % in the negative electrode active material layer. When the above range is satisfied, since a conductive path of the negative electrode may be secured, the life characteristics of the battery may be improved while a low level of the electrode resistance is maintained. In a case in which bundle type carbon nanotubes are completely dispersed (as a general dispersion method, dispersion is performed so that single strands of the carbon nanotube units are separated from each other as much as possible) during the preparation of the conductive agent dispersion, the carbon nanotube structure is not generated, or is generated in a very small amount (for example, 0.0005 wt %) even if it is unintentionally generated. That is, the above amount range may never be achieved in the usual way.

With respect to the related art in which the negative electrode includes multi-walled carbon nanotube units, a high amount (e.g., greater than 0.5 wt %) of the multi-walled carbon nanotube unit has to be used to compensate for low conductivity of the multi-walled carbon nanotube unit. Also, even in a case in which the negative electrode is prepared by using a conductive agent dispersion in which the single-walled carbon nanotube units are completely dispersed, the single-walled carbon nanotube units may not be used in a low amount due to the problem that the single-walled carbon nanotube units are cut.

In contrast, the carbon nanotube structure included in the negative electrode of the present disclosure is in the form in which a plurality of single-walled carbon nanotube units are bonded side by side. Thus, the carbon nanotube structure may not be cut even with the excessive changes in the volume of the negative electrode active material and their length may be smoothly maintained. Therefore, the conductivity of the negative electrode may be maintained, and the conductivity of the negative electrode may be smoothly secured due to the high conductivity of the single-walled carbon nanotube unit. Accordingly, the life characteristics of the battery may be excellent even if the amount of the carbon nanotube structure in the negative electrode is low.

In some cases, the single-walled carbon nanotube unit may be surface-treated by an oxidation treatment or nitridation treatment to improve affinity with the dispersant.

The conductive agent may further include a point-type conductive agent. The point-type conductive agent may include carbon black. Since the carbon black has high dispersibility and conductivity and may fill large pores between the negative electrode active materials in the negative electrode, the binder migration may be more effectively suppressed when the carbon black is used in combination with the carbon nanotube structure. The carbon black may be at least one selected from the group consisting of acetylene black, Ketjen black, channel black, and furnace black, but is not limited thereto.

A weight ratio of the carbon nanotube structure to the point-type conductive agent may be in a range of 1:5 to 1:70, for example, 1:5 to 1:35. When the above range is satisfied, a long conductive network may be formed by the carbon nanotube structure, and uniformity of the conductive network may be further improved because the point-type conductive agent acts as a hub in the conductive network. Also, since the pores between the negative electrode active materials may be filled by the point-type conductive agent, the negative electrode adhesion may be improved and output characteristics, storage characteristics, and life characteristics of the battery may be improved.

The dispersant may include a polymer dispersant containing an amine and a phenolic compound containing two or more aromatic rings, and may specifically be composed of a polymer dispersant containing an amine and a phenolic compound containing two or more aromatic rings. In a case in which the two kinds of dispersants are used, since the carbon nanotube structures are effectively dispersed and present in the negative electrode and may form a long network, the binder migration may be effectively suppressed.

Specifically, the carbon nanotube structure is present in the conductive agent dispersion, and an electrode slurry is formed through the conductive agent dispersion, wherein the two kinds of dispersants form carbon nanotube structures having an appropriate diameter in the conductive agent dispersion and may also play a role in suppressing re-aggregation of the carbon nanotube structures during the preparation of the electrode slurry. Accordingly, the carbon nanotube structures are evenly dispersed in the negative electrode slurry to form an effective network and simultaneously increase the zero-shear viscosity of the negative electrode slurry. Thus, the binder migration may be suppressed by the network caused by the carbon nanotube structures. Also, even if the negative electrode slurry is coated on the current collector, the binder migration in the negative electrode slurry may be further suppressed by the zero-shear viscosity. As a result, a sufficient amount of the binder may be present in the lower portion of the negative electrode active material layer.

Therefore, since the negative electrode adhesion may be improved, life performance of the battery may be improved. Furthermore, since the negative electrode adhesion is not reduced even if coating speed of the negative electrode active material layer is increased, productivity of the negative electrode may be improved.

The polymer dispersant containing an amine, for example, may be at least one selected from the group consisting of polyvinylpyrrolidone, polyacrylic acid hydrazide, poly-N-vinyl-5-methoxazolidon, N-alkyl polyimine, N-acetyl polyimine, polyacrylamide, poly-L-lysine hydrobromide, benzyl-dodecyl-dimethylammonium chloride, and polyethylenimine. In a case in which the specific polymer dispersant, in which an amine is contained in a polymer structure, is used as described above, the carbon nanotube structures may be effectively dispersed in the negative electrode. More specifically, the polymer dispersant containing an amine may be polyvinylpyrrolidone.

Next, the phenolic compound containing two or more aromatic rings may reduce the viscosity of the carbon nanotube dispersion, particularly a water-based carbon nanotube dispersion and may significantly improve the increase in viscosity over time due to a bulky structure generated by the two or more aromatic rings and an influence of a hydroxy group included in a phenolic group. In a case in which phenolic compounds containing only one aromatic ring (for example, dopamine, gallic acid, pyrogallol, catechol, etc.) were used, an effect of improving viscosity of the dispersion and an effect of suppressing a change in viscosity over time were not sufficient.

Preferably, the phenolic compound may include at least one structure selected from the group consisting of a phenolic structure, a catechol structure, a gallol structure, and a naphthol structure in at least one of the aromatic rings, and may specifically include at least one structure selected from the group consisting of a catechol structure and a gallol structure in at least one of the aromatic rings. The phenolic structure is a structure in which one hydroxy group is bonded to a benzene ring, the catechol structure is a structure in which two hydroxy groups are bonded to a benzene ring, the gallol structure is a structure in which three hydroxy groups are bonded to a benzene ring, and the naphthol structure is a structure in which one hydroxy group is bonded to naphthalene.

In a case in which the phenolic compound containing two or more aromatic rings includes the above structure, since an interaction between the aromatic ring and the carbon nanotube and an interaction by hydrogen bonding between-OH of the phenolic compound and the polymer dispersant are properly balanced in the carbon nanotube dispersion, effects of reducing the viscosity of the conductive agent dispersion and suppressing the increase in viscosity over may be exhibited.

Specific examples of the phenolic compound containing two or more aromatic rings may be at least one selected from the group consisting of baicalin, luteolin, taxifolin, myricetin, quercetin, rutin, catechin, epigallocatechin gallate, butein, piceatannol, and tannic acid, and may preferably be tannic acid, quercetin, epigallocatechin gallate, or a combination thereof.

In an example of the present disclosure, the aromatic ring contained in the phenolic compound containing two or more aromatic rings may have a structure in which one aromatic ring, which is not fused with another aromatic ring, or two aromatic rings are fused to each other, and a structure, in which three or more aromatic rings are fused to each other, may not be included.

That is, the inclusion of a structure in which three or more aromatic rings are fused in a molecular structure may be excluded from a range of the phenolic compound containing two or more aromatic rings.

In a case in which the phenolic compound containing two or more aromatic rings includes the structure in which three or more aromatic rings are fused in the molecular structure, since the structure in which the three or more aromatic rings are fused may induce agglomeration between the carbon nanotubes by exerting a more than adequate strong binding force with the carbon nanotubes in the carbon nanotube dispersion, may not be suitable for improving the dispersibility of the carbon nanotubes. Also, since the balance between the interaction between the aromatic ring and the carbon nanotube and the interaction by the hydrogen bonding between-OH of the phenolic compound and the polymer dispersant in the carbon nanotube dispersion is broken, it may be difficult to properly exhibit the effect of reducing the viscosity of the carbon nanotube dispersion and the effect of suppressing the increase in viscosity over time.

Specifically, the phenolic compound containing two or more aromatic rings may be tannic acid. In this case, the bundle type carbon nanotubes may be smoothly dispersed during the preparation of the conductive agent dispersion.

A weight ratio of the polymer dispersant containing an amine to the phenolic compound containing two or more aromatic rings may be in a range of 5:1 to 1:1, particularly 4:1 to 2:1, and more particularly 3.5:1 to 2.5:1. When the above range is satisfied, the dispersibility of the carbon nanotube structure is improved, and there is an effect of reducing the viscosity of the carbon nanotube dispersion.

The dispersant may include polyvinylpyrrolidone, as the polymer dispersing agent containing an amine, and tannic acid as the phenolic compound containing two or more aromatic rings. In a case in which the polyvinylpyrrolidone is used in combination with the tannic acid, effects of reducing the dispersibility and dispersion stability of the carbon nanotube structure and the viscosity of the carbon nanotube structure may be simultaneously obtained.

The dispersant may be included in an amount of 0.005 wt % to 0.5 wt % in the negative electrode active material layer, and may be specifically included in an amount of 0.02 wt % to 0.3 wt %. In a case in which the above range is satisfied, the carbon nanotube structure may be smoothly dispersed so that the conductive network may be smoothly developed, and the negative electrode adhesion and cell life performance may be improved because the binder migration may be suppressed.

The dispersant may be included in an amount of 50 parts by weight to 200 parts by weight based on 100 parts by weight of the carbon nanotube structure in the negative electrode, and may be specifically included in an amount of 80 parts by weight to 170 parts by weight. When the above range is satisfied, the dispersibility of the carbon nanotube structure may be improved, the viscosity of the dispersion may be reduced, and the change over time may be improved.

In the negative electrode, QBR according to the following Equation 1 may be in a range of 1 to 1.75, particularly 1 to 1.65, and more particularly 1 to 1.60.

$$QBR = Bs/Bf \quad \text{[Equation 1]}$$

wherein Bs is an average value of the number of binders which is measured in a range (upper range) from an upper surface of the negative electrode active material layer to a distance corresponding to 15% of a total thickness of the negative electrode active material layer in a direction toward a lower surface of the negative electrode active material layer, and Bf is an average value of the number of binders which is measured in a range (lower range) from the lower surface of the negative electrode active material layer to a distance corresponding to 15% of the total thickness of the negative electrode active material layer in a direction toward the upper surface of the negative electrode active material layer. Referring to FIGURE, a negative electrode active material layer 200 is disposed on a current collector 100, and the expression "direction D" is a direction perpendicular to an upper surface 200*a* or a lower surface 200*b* of the negative electrode active material layer 200, wherein it means a thickness direction of the negative electrode active material layer 200.

Specifically, each of the ranges means a product of a thickness corresponding to 15% of the total thickness of the negative electrode active material layer 200 and a horizontal length at a corresponding magnification (ex. 400 times), wherein the horizontal length may be in a range of 200 μm to 500 μm, and may specifically be 300 μm. In addition, the number of binders may be confirmed by staining the binder in the negative electrode active material layer with $OsO_4$, performing SEM-EDS mapping analysis on a cross section of the negative electrode active material layer, and counting signals of $OsO_4$ which are confirmed in each of the upper range and the lower range. The expression "average value" means a value obtained by adding the number of binders, which was measured 100 times by the above-described measurement method, and then dividing it by 100.

In a case in which QBR is less than 1, since the binder is intensively distributed only in the lower portion (closer to the current collector) of the negative electrode active material layer, interfacial resistance is increased, and battery resistance is increased and the life characteristics are reduced due to non-uniform resistance of the negative electrode active material layer. In contrast, in a case in which QBR is greater than 1.75, since an excessive large amount of the binder is distributed in the upper portion of the negative electrode active material layer, the negative electrode adhesion is reduced and the life characteristics of the battery are poor.

In contrast, in the present disclosure, the binder migration phenomenon may be minimized because the carbon nanotube structure having specific physical properties is used at an appropriate level as the conductive agent, the two kinds of dispersants are used, and a specific preparation method is used, and, accordingly, QBR may satisfy a range of 1 to 1.75.

Method of Preparing Negative Electrode

Next, a method of preparing the electrode of the present disclosure will be described.

The method of preparing the negative electrode of the present disclosure includes the steps of: preparing a conductive agent dispersion (S1); forming a negative electrode slurry including the conductive agent dispersion, a negative electrode active material, a binder, and a dispersant (S2), wherein the preparing of the conductive agent dispersion (S1) includes the steps of: preparing a mixed solution containing a dispersion medium, a dispersant, and bundle type single-walled carbon nanotubes (S1-1); and forming a carbon nanotube structure, in which a plurality of single-walled carbon nanotube units are bonded side by side, by dispersing the bundle type single-walled carbon nanotubes by applying a shear force to the mixed solution through a high-pressure homogenizer (S1-2), wherein the carbon nanotube structure has an average length of 1 μm to 20 μm, and QBR according to the following Equation 1 may be in a range of 1 to 1.75.

$$QBR = Bs/Bf \qquad \text{[Equation 1]}$$

The negative electrode includes a negative electrode active material layer that is formed from the negative electrode slurry, wherein Bs is an average value of the number of binders which is measured in a range from an upper surface of the negative electrode active material layer to a distance corresponding to 15% of a total thickness of the negative electrode active material layer in a direction toward a lower surface of the negative electrode active material layer, and Bf is an average value of the number of binders which is measured in a range from the lower surface of the negative electrode active material layer to a distance corresponding to 15% of the total thickness of the negative electrode active material layer in a direction toward the upper surface of the negative electrode active material layer.

The negative electrode of the above-described embodiment may be prepared by the above method. The negative electrode active material, the binder, the dispersant, and the carbon nanotube structure are the same as the negative electrode active material, the binder, the dispersant, and the carbon nanotube structure which have been described in the above-described embodiment.

(1) Preparing of the Conductive Agent Dispersion (S1)

The preparing of the conductive agent dispersion (S1) may include the steps of: preparing a mixed solution containing a dispersion medium, a dispersant, and bundle type single-walled carbon nanotubes (S1-1); and forming a carbon nanotube structure, in which a plurality of single-walled carbon nanotube units are bonded side by side, by dispersing the bundle type single-walled carbon nanotubes by applying a shear force to the mixed solution through a high-pressure homogenizer (S1-2).

In step S1-1, the mixed solution may be prepared by adding bundle type single-walled carbon nanotubes and a dispersant to a dispersion medium. The bundle type single-walled carbon nanotubes are present in the form of a bundle in which the above-described single-walled carbon nanotube units are bonded, wherein the bundle type carbon nanotube, for example, includes 5,000 or more single-walled carbon nanotube units.

The bundle type single-walled carbon nanotubes may be included in an amount of 0.01 wt % to 0.1 wt % in the mixed solution. When the above range is satisfied, since the bundle type single-walled carbon nanotubes are dispersed in an appropriate level, a carbon nanotube structure may be formed at an appropriate level and dispersion stability may be improved.

The dispersion medium, for example, may include an amide-based polar organic solvent such as water ($H_2O$), dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used, but the present disclosure is not limited thereto. Specifically, the dispersion medium may be N-methylpyrrolidone (NMP).

The dispersant is the same as that of the dispersant of the above-described embodiment, and thus, the same description will be omitted. As the dispersant is used, dispersibility of the carbon nanotube structure may be improved, viscosity of the dispersion for preparing the negative electrode slurry may be reduced, and the dispersion stability may be improved. Accordingly, the binder migration may be effectively suppressed.

A weight ratio of the bundle type carbon nanotubes to the dispersant in the conductive agent dispersion may be in a range of 1:0.1 to 1:10, for example, 1:1 to 1:10. In a case in which the above range is satisfied, since the bundle type single-walled carbon nanotubes are dispersed in an appropriate level, a carbon nanotube structure may be formed at an appropriate level and the dispersion stability may be improved.

A solid content in the mixed solution may be in a range of 0.1 wt % to 20 wt %, for example, 1 wt % to 10 wt %. In a case in which the above range is satisfied, since the bundle type single-walled carbon nanotubes are dispersed in an appropriate level, a carbon nanotube structure may be formed at an appropriate level and the dispersion stability may be improved. Also, the negative electrode slurry may have viscosity and elasticity suitable for an electrode preparation process, and it also contributes to increase the solid content of the negative electrode slurry.

In step S1-2, the mixed solution may be stirred through a high-pressure homogenizer, and the bundle type single-walled carbon nanotubes may be dispersed in this process to form a carbon nanotube structure. The carbon nanotube structure is one in which a plurality of single-walled carbon nanotube units are bonded side by side, wherein it is the same as the carbon nanotube structure described in relation to the negative electrode of the above-described embodiment.

The high-pressure homogenizer may include a primary nozzle and a secondary nozzle. The mixed solution sequentially passes through the first nozzle and the second nozzle while a pressure is applied to the mixed solution. Since a diameter of the secondary nozzle is smaller than a diameter of the primary nozzle, the mixed solution receives a shear force while passing through the nozzles, and, in this case, the bundle type single-walled carbon nanotubes are dispersed.

The primary nozzle may have a diameter of 100 mm to 500 mm, particularly 150 mm to 300 mm, and more particularly 150 nm to 250 mm. The secondary nozzle may have a diameter of 100 μm to 1,000 μm, particularly 200 μm to 800 μm, and more particularly 200 μm to 650 μm. Also, the pressure may be in a range of 500 Bar to 1, 800 Bar, may be specifically in a range of 5,000 Bar to 1,600 Bar, and may be more specifically in a range of 800 Bar to 1,600 Bar. If the pressure is 1,800 Bar or more, since the bundle type single-walled carbon nanotubes are completely dispersed, the carbon nanotube structure may not be smoothly formed.

The passing of the mixed solution through the high-pressure homogenizer may be performed 5 times to 10 times, and, accordingly, a diameter of the carbon nanotube structure may be in a range of 1 nm to 30 nm.

In step S1, different from a conventional method of completely dispersing the bundle type single-walled carbon nanotubes, the bundle type single-walled carbon nanotubes are not completely dispersed, but are dispersed to an appropriate level by appropriately combining conditions such as conditions (nozzle size, pressure, etc.) of the high-pressure homogenizer used, physical properties of the bundle type single-walled carbon nanotubes used, and the dispersant used. In the conductive agent dispersion thus formed, there is little or no single-walled carbon nanotube units independently present in the form of a single strand, and most of them may exist as the above-described carbon nanotube structure.

(2) Forming of the Negative Electrode Slurry Including the Conductive Agent Dispersion, Negative Electrode Active Material, Binder, and Dispersant (S2)

Step S2 may include the steps of stirring an active material solution including an active material, a binder, and a solvent (S2-1) and adding the conductive agent dispersion to the stirred active material solution (S2-2).

The active material solution may include the negative electrode active material, the binder, and the solution.

In this case, the negative electrode active material of the above-described embodiment may be used as the negative electrode active material. The binder of the above-described embodiment may be used as the binder. The solvent, for example, may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, Y-butyrolactone, and s-propiolactone, and any one thereof or a mixture of two or more thereof may be used, but the present disclosure is not limited thereto. The solvent may be the same or different from the dispersion medium used in a pre-dispersion, and the solvent may preferably be N-methylpyrrolidone (NMP).

The conductive network by the carbon nanotube structure may be smoothly formed by effectively dispersing the negative electrode active material by step S2-1. That is, step S2-1 is one of main factors from which a configuration, in which QBR according to Equation 1 is in a range of 1 to 1.75, may be derived.

In step S2-1, the stirring includes transmitting a strong shear force to the active material solution. In this case, the shear force may be applied through an HIVIS MIX Planetary mixer/Kneader by PRIMIX B.V.

The binder used in step S2-1 may be carboxymethyl cellulose. In that case, a weight of the carboxymethyl cellulose used in step S2-1 may be in a range of 30% to 70%, for example, 40% to 60% of a total weight of carboxymethyl cellulose to be included in the negative electrode active material layer. In this case, since the shear force may be effectively applied to the active material solution, the negative electrode active material may be more effectively dispersed in the active material solution and adhesion of the negative electrode active material layer may be improved.

In step S2-2, the conductive agent dispersion prepared in step S1 may be added to the stirred active material solution. Furthermore, a negative electrode slurry may be prepared by adding the conductive agent dispersion to the active material solution and then stirring. Also, a binder may be additionally added in step S2-2.

The negative electrode active material includes graphite, and the graphite may be included in an amount of 80 wt % to 99 wt %, for example, 90 wt % to 98 wt % based on a total solid content in the negative electrode slurry.

The solid content in the negative electrode slurry may be in a range of 40 wt % to 80 wt %, specifically, 40 wt % to 60 wt %. In a case in which the above range is satisfied, migration of the conductive agent and the binder due to evaporation of the solvent may be suppressed during drying after coating the negative electrode slurry, and a negative electrode having excellent electrode adhesion and electrical conductivity may be prepared. Furthermore, a high-quality negative electrode with little deformation of the negative electrode during rolling may be prepared.

The carbon nanotube structure may be included in an amount of 0.005 wt % to 0.2 wt % in the solid content of the negative electrode slurry, may be particularly included in an amount of 0.01 wt % to 0.1 wt %, and may be more particularly included in an amount of 0.015 wt % to 0.075 wt %. When the above range is satisfied, since the conductive path of the electrode is secured, the life characteristics of the battery may be improved while maintaining a low level of the electrode resistance.

Next, the negative electrode slurry prepared as described above is dried to form a negative electrode active material layer. Specifically, the negative electrode active material layer may be prepared by a method of coating the negative electrode slurry on an electrode current collector and drying the coated electrode current collector, or may be prepared by a method of casting the negative electrode slurry on a separate support and then laminating a film separated from the support on the negative electrode current collector. If necessary, the negative electrode active material layer is formed by the above-described method, and a rolling process may then be further performed. In this case, the drying and the rolling may be performed under appropriate conditions in consideration of physical properties of the electrode to be finally prepared, and are not particularly limited. The carbon nanotube structure may be included in an amount of 0.005 wt % to 0.2 wt % in the negative electrode active material layer.

Secondary Battery

Next, a secondary battery according to another embodiment of the present disclosure will be described.

The secondary battery according to another embodiment of the present disclosure may include the negative electrode of the above-described embodiment.

Specifically, the secondary battery may include the negative electrode, a positive electrode, a separator disposed between the positive electrode and the negative electrode, and an electrolyte, wherein the negative electrode is the same as the negative electrode of the above-described embodiment. Since the negative electrode has been described above, detailed descriptions thereof will be omitted.

The positive electrode may include a positive electrode current collector and a positive electrode active material layer which is formed on the positive electrode current collector and includes a positive electrode active material.

In the positive electrode, the positive electrode current collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode current collector may typically have a thickness of 3 μm to 500 μm and may have a surface with fine roughness to improve adhesion to the positive electrode active material. The positive electrode current collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of lithium (Li) being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode current collector. Specific examples of the positive electrode binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non-aqueous electrolyte solution, wherein, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3$, $CF_3CO_2^-$, $CH_3CO_2$, SCN, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present disclosure, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present disclosure will be described in more detail, according to specific examples.

Preparation Example 1-1: Preparation of Conductive Agent Dispersion 0.8 parts by weight of bundle type carbon nanotubes (specific surface area was 650 $m^2/g$) composed of single-walled carbon nanotube units having an average diameter of 1.5 nm and an average length of 5 μm and 1.2 parts by weight of a dispersant were mixed in 98 parts by weight of N-methylpyrrolidone (NMP), as a dispersion medium, to prepare a mixed solution so that a solid content was 1.0 wt %. After the mixed solution was put into a high-pressure homogenizer, a pressure of 1,000 Bar was applied to the mixed solution and the mixed solution was sequentially passed through a primary nozzle having a diameter of 200 mm and a secondary nozzle having a diameter of 500 μm a total of 6 times.

As the dispersant, polyvinylpyrrolidone and tannic acid were used in a weight ratio of 3:1.

Preparation Example 2-1: Preparation of Conductive Agent Dispersion 7.0 parts by weight of bundle type carbon nanotubes (specific surface area was 185 $m^2/g$) composed of multi-walled carbon nanotube units having an average diameter of 10 nm and an average length of 1 μm and 1.4 parts by weight of a dispersant were mixed in 91.6 parts by weight of N-methylpyrrolidone (NMP), as a dispersion medium, to prepare a mixed solution so that a solid content was 8.4 wt %. After the mixed solution was put into a high-pressure homogenizer, a pressure of 1,000 Bar was applied to the mixed solution and the mixed solution was sequentially passed through a primary nozzle having a diameter of 200 mm and a secondary nozzle having a diameter of 500 μm a total of 7 times.

As the dispersant, polyvinylpyrrolidone and tannic acid were used in a weight ratio of 3:1.

Preparation Example 2-2: Preparation of Conductive Agent Dispersion

A conductive agent dispersion was prepared in the same manner as in Preparation Example 1-1 except that only polyvinylpyrrolidone was used as the dispersant.

Preparation Example 2-3: Preparation of Conductive Agent Dispersion

A conductive agent dispersion was prepared in the same manner as in Preparation Example 1-1 except that only tannic acid was used as the dispersant.

Preparation Example 2-4: Preparation of Conductive Agent Dispersion

A dispersion was prepared in the same manner as in Preparation Example 1-1 except that the mixed solution was passed through the high-pressure homogenizer a total of 4 times instead of a total of 7 times.

Preparation Example 2-5: Preparation of Conductive Agent Dispersion

A dispersion was prepared in the same manner as in Preparation Example 1-1 except that the mixed solution was passed through the high-pressure homogenizer a total of 13 times instead of a total of 7 times.

EXAMPLES AND COMPARATIVE EXAMPLES

Example 1: Preparation of Negative Electrode (1) Active Material Solution Preparation and Stirring Artificial graphite having an average particle diameter ($D_{50}$) of 15 μm was used as a negative electrode active material. The negative electrode active material and a carboxymethyl cellulose aqueous solution were mixed. In this case, 1 wt % of carboxymethyl cellulose was dissolved in the carboxymethyl cellulose aqueous solution, and the carboxymethyl cellulose (CMC) had a weight-average molecular weight of 100,000 g/mol and a degree of substitution of 1.0. A weight of the carboxymethyl cellulose used was 50% of a weight of carboxymethyl cellulose finally included in a negative electrode active material layer.

The mixture was stirred (kneading) while applying a strong shear force through a planetary mixer. An active material solution was prepared through this.

(2) Negative Electrode Slurry Preparation

The active material solution, a styrene butadiene rubber (SBR) and carboxymethyl cellulose (CMC) (weight-average molecular weight: 100,000 g/mol, degree of substitution: 1.0), as a binder, and the conductive agent dispersion of Preparation Example 1 were mixed to prepare a negative electrode slurry (solvent:$H_2O$). A weight ratio of the negative electrode active material, the binder, the carbon nanotube structure, and the dispersant was 96.925:3.0:0.03:0.045. A weight ratio of the SBR to the CMC was 2.0:1.0.

Each negative electrode slurry was coated on a 20 μm thick copper (Cu) metal thin film, as a negative electrode current collector, at a loading of 300 mg/25 $cm^2$, and dried. In this case, a temperature of circulating air was 70° C. Subsequently, the negative electrode current collector, on which the slurry was coated and dried, was roll-pressed and dried in a vacuum oven at 130° C. for 8 hours to prepare a negative electrode including a negative electrode active material layer.

Example 2 and Comparative Examples 1 to 5: Preparation of Negative Electrode Negative electrodes were prepared in the same manner as in Example 1 except that conditions were changed as shown in Table 1 below.

Comparative Example 6: Preparation of Negative Electrode

Artificial graphite having an average particle diameter ($D_{50}$) of 15 μm was used as a negative electrode active material. The negative electrode active material, a styrene butadiene rubber (SBR) and carboxymethyl cellulose (CMC) (weight-average molecular weight: 100,000 g/mol, degree of substitution: 1.0), as a binder, the conductive agent dispersion of Preparation Example 1, and water, as a solvent, were collectively put into a stirrer, and the negative electrode active material, the binder, and the conductive agent dispersion were mixed at once to prepare a negative electrode slurry. A weight ratio of the negative electrode active material, the binder, the carbon nanotube structure, and the dispersant was 96.925:3.0:0.03:0.045. A weight ratio of the SBR to the CMC was 2.0:1.0.

Each negative electrode slurry was coated on a 20 μm thick copper (Cu) metal thin film, as a negative electrode current collector, at a loading of 300 mg/25 $cm^2$, and dried. In this case, a temperature of circulating air was 70° C. Subsequently, the negative electrode current collector, on which the slurry was coated and dried, was roll-pressed and dried in a vacuum oven at 130° C. for 8 hours to prepare a negative electrode including a negative electrode active material layer.

TABLE 1

| | Conductive agent dispersion type | Conductive agent type and amount (wt %) Carbon nanotube structure | Multi-walled carbon nanotubes | Carbon black | High-pressure homogenizer the number of times | Dispersant type and amount (wt %) Polyvinyl-pyrrolidone | Tannic acid | State of carbon nanotube structure Average length (μm) | Average diameter (nm) |
|---|---|---|---|---|---|---|---|---|---|
| Example 1 | Preparation Example 1-1 | 0.03 | — | — | 7 | 0.0338 | 0.0113 | 6.5 | 20 |
| Example 2 | Preparation Example 1-1 | 0.03 | — | 0.97 | 7 | 0.0338 | 0.0113 | 6.5 | 20 |
| Comparative Example 1 | Preparation Example 2-1 | — | 0.7 | — | 7 | 0.105 | 0.035 | 0.6 (MWCNT) | 20 (MWCNT) |
| Comparative Example 2 | Preparation Example 2-2 | 0.03 | — | — | 7 | 0.045 | — | 50 | 150 |
| Comparative Example 3 | Preparation Example 2-3 | 0.03 | — | — | 7 | — | 0.045 | 100 | 300 |
| Comparative Example 4 | Preparation Example 2-4 | 0.03 | — | — | 4 | 0.0338 | 0.0113 | 25 | 65 |

TABLE 1-continued

| | Conductive agent dispersion type | Conductive agent type and amount (wt %) | | | High-pressure homogenizer | Dispersant type and amount (wt %) | | State of carbon nanotube structure | |
|---|---|---|---|---|---|---|---|---|---|
| | | Carbon nanotube structure | Multi-walled carbon nanotubes | Carbon black | the number of times | Polyvinyl-pyrrolidone | Tannic acid | Average length (μm) | Average diameter (nm) |
| Comparative Example 5 | Preparation Example 2-5 | 0.03 | — | — | 13 | 0.0338 | 0.0113 | 0.6 | 7.5 |
| Comparative Example 6 | Preparation Example 1-1 | 0.03 | — | — | 7 | 0.0338 | 0.0113 | 6.5 | 20 |

The average length and average diameter were confirmed through an SEM. Specifically, the average length (or average diameter) was evaluated as an average value of top 100 carbon nanotube structures (or multi-walled carbon nanotube units) having a large average length (or average diameter) and bottom 100 carbon nanotube structures (or multi-walled carbon nanotube units).

Experimental Example 1: Binder Migration Degree Evaluation (QBR)

A QBR value of Equation 1 was confirmed for each of the negative electrodes of the examples and the comparative examples.

$$QBR = Bs/Bf \quad \text{[Equation 1]}$$

Bs is an average value of the number of binders which was measured in a range (upper range) from an upper surface of the negative electrode active material layer to a distance corresponding to 15% of a total thickness of the negative electrode active material layer in a direction toward a lower surface of the negative electrode active material layer, and Bf is an average value of the number of binders which was measured in a range (lower range) from the lower surface of the negative electrode active material layer to a distance corresponding to 15% of the total thickness of the negative electrode active material layer in a direction toward the upper surface of the negative electrode active material layer. The range means a product of a thickness corresponding to 15% of the total thickness of the negative electrode active material layer and a length of 300 μm. In addition, the number of binders was confirmed by staining the binder in the negative electrode active material layer with $OsO_4$, performing SEM-EDS mapping analysis (magnification: 400 times) on a cross section of the negative electrode active material layer, and then counting signals of $OsO_4$ which were confirmed in each of the upper range and the lower range. Such a measurement was performed 100 times and the QBR value was determined as their average value.

Experimental Example 2: Negative Electrode Adhesion Evaluation

After the negative electrode, punched out to a width of 20 mm and a length of 15 cm, was attached to a slide glass through a double-sided tape, the negative electrode was pressed with a constant pressure. Specifically, a 90° peel test was performed to confirm negative electrode adhesion in gf/20 mm units.

TABLE 2

| | QBR | Negative electrode adhesion (gf/20 mm) |
|---|---|---|
| Example 1 | 1.53 | 30.8 |
| Example 2 | 1.43 | 33.8 |
| Comparative Example 1 | 2.10 | 16.5 |
| Comparative Example 2 | 2.01 | 17.2 |
| Comparative Example 3 | 2.07 | 16.7 |
| Comparative Example 4 | 1.81 | 21.5 |
| Comparative Example 5 | 1.85 | 19.0 |
| Comparative Example 6 | 2.21 | 14.1 |

Referring to Table 2, with respect to Examples 1 and 2, since QBR values were lower than those of the comparative examples, it may be understood that the binder migration phenomenon occurred less, and, accordingly, it may be confirmed that negative electrode adhesion values were high.

The invention claimed is:

1. A negative electrode comprising a negative electrode active material layer, wherein the negative electrode active material layer comprises a negative electrode active material, a binder, a conductive agent, and a dispersant, wherein the conductive agent comprises a carbon nanotube structure in which a plurality of single-walled carbon nanotube units are bonded side by side, wherein the carbon nanotube structure has an average length of 1 μm to 20 μm, and wherein QBR according to Equation 1 is in a range of greater than 1 to 1.75:

$$QBR = Bs/Bf \quad \text{[Equation 1]}$$

wherein Bs is an average value of an amount of binder which is measured in a range from an upper surface of the negative electrode active material layer to a distance corresponding to 15% of a total thickness of the negative electrode active material layer in a direction toward a lower surface of the negative electrode active material layer, and Bf is an average value of an amount of binder which is measured in a range from the lower surface of the negative electrode active material layer to a distance corresponding to 15% of the total thickness of the negative electrode active material layer in a direction toward the upper surface of the negative electrode active material layer.

2. The negative electrode of claim 1, wherein the carbon nanotube structure is included in an amount of 0.005 wt % to 0.2 wt % in the negative electrode active material layer.

3. The negative electrode of claim 1, wherein the carbon nanotube structure has an average diameter of 5 nm to 100 nm.

4. The negative electrode of claim 1, wherein the dispersant comprises a polymer dispersant containing an amine and a phenolic compound containing two or more aromatic rings.

5. The negative electrode of claim 4, wherein the polymer dispersant containing the amine comprises polyvinylpyrrolidone.

6. The negative electrode of claim 4, wherein the phenolic compound containing two or more aromatic rings comprises tannic acid.

7. The negative electrode of claim 4, wherein a weight ratio of the polymer dispersant containing the amine to the phenolic compound containing two or more aromatic rings is in a range of 5:1 to 1:1.

8. The negative electrode of claim 1, wherein the dispersant is included in an amount of 50 parts by weight to 200 parts by weight based on 100 parts by weight of the carbon nanotube structure in the negative electrode active material layer.

9. The negative electrode of claim 1, wherein the conductive agent further comprises a point-type conductive agent.

10. The negative electrode of claim 9, wherein a weight ratio of the carbon nanotube structure to the point-type conductive agent is in a range of 1:5 to 1:70.

11. The negative electrode of claim 1, wherein the negative electrode active material comprises graphite.

12. A method of preparing a negative electrode, the method comprising:

preparing a conductive agent dispersion (S1);

forming a negative electrode slurry including the conductive agent dispersion, a negative electrode active material, a binder, and a solvent (S2), wherein the preparing of the conductive agent dispersion (Sl) comprises:

preparing a mixed solution containing a dispersion medium, a dispersant, and bundle type single-walled carbon nanotubes (Sl-1); and forming a carbon nanotube structure, in which a plurality of single-walled carbon nanotube units are bonded side by side, by dispersing the bundle type single-walled carbon nanotubes by applying a shear force to the mixed solution through a high-pressure homogenizer (Sl-2), wherein the carbon nanotube structure has an average length of 1 μm to 20 μm, and QBR according to Equation 1 is in a range of greater than 1 to 1.75:

$$QBR = Bs/Bf \quad \text{[Equation 1]}$$

the negative electrode comprises a negative electrode active material layer that is formed from the negative electrode slurry, wherein Bs is an average value of an amount of binder which is measured in a range from an upper surface of the negative electrode active material layer to a distance corresponding to 15% of a total thickness of the negative electrode active material layer in a direction toward a lower surface of the negative electrode active material layer, and wherein Bf is an average value of an amount of binder which is measured in a range from the lower surface of the negative electrode active material layer to a distance corresponding to 15% of the total thickness of the negative electrode active material layer in a direction toward the upper surface of the negative electrode active material layer.

13. A secondary battery comprising the negative electrode of claim 1.

14. The negative electrode of claim 1, wherein the QBR according to Equation 1 ranges from 1.43 to 1.75.

* * * * *